United States Patent [19]

Liang et al.

[11] 4,150,203

[45] Apr. 17, 1979

[54] SOLID ELECTROLYTE ADDITIVE

[75] Inventors: Charles C. Liang, Andover, Mass.; Ashok V. Joshi, Levittown, Pa.

[73] Assignee: P.R. Mallory & Co. Inc., Indianapolis, Ind.

[21] Appl. No.: 868,645

[22] Filed: Jan. 11, 1978

[51] Int. Cl.$^2$ ............................................... H01M 6/18
[52] U.S. Cl. ..................................... 429/193; 106/73.4
[58] Field of Search ........................ 429/193; 106/73.4

[56] References Cited

U.S. PATENT DOCUMENTS

| | | | |
|---|---|---|---|
| 3,713,897 | 10/1970 | Liang | 429/193 |
| 3,730,775 | 5/1973 | Liang | 429/193 |
| 4,007,122 | 2/1977 | Owens et al. | 429/193 |
| 4,052,538 | 10/1977 | Eddy et al. | 429/193 |

*Primary Examiner*—Donald L. Walton
*Attorney, Agent, or Firm*—Ronald S. Cornell; Israel Nissenbaum; Charles W. Hoffmann

[57] ABSTRACT

A solid electrolyte additive for high energy density solid state cells, comprising aluminum oxide treated with a polar covalently bonded alkali metal.

12 Claims, No Drawings

SOLID ELECTROLYTE ADDITIVE

This invention relates to solid alkali metal salt electrolytes, for solid state cells, having aluminum oxide as an ionic conductivity enhancer therein. More particularly, this ivention relates to lithium salts mixed with aluminum oxide as electrolytes in high energy density solid state cells.

A major drawback of solution cells, or even so-called dry cells, is that the electrolytes therein are in a mobile fluid or paste-like state. Accordingly, there is a tendency for such cells to leak electrolyte over extended periods of time especially when such cells are stored or kept idle. The use of hermetic seals for such cells may obviate the above problem, but there is an additional problem of self discharge within the cells themselves. Components of a cell, when in a mobile fluid or paste-like state, eventually react internally (albeit slowly) because of the increased molecular motion and surface contact area of fluids. As a result, such cells seldom have utilizable lifetimes exceeding two or more years.

Solid state cells in which all of the components are in the solid form do not have the leakage or self discharge problems inherent in solution type cells. Solid state cells can thus last in excess of 10 years when stored without any noticeable degradation of either voltage or physical appearance. However, with such benefit there is a penalty. Ionic transfer, which completes the internal circuit of any electrochemical cell, is highly restricted in solid electrolyte cells as a result of the low ionic conductivity of solids. Accordingly, the rate capability of such cells, which is dependent upon the ionic conductivity of the solid electrolytes therein, is usually low.

At first, solid state cells of the prior art included low energy density materials such as silver for anodes. The use of such materials enabled the further use of highly conductive solid electrolytes such as rubidium silver iodide (RbAg$_4$I$_5$) having a room temperature ionic conductivity of about $2\times10^{-1}$ohm$^{-1}$cm$^{-1}$ and a discharge capability of about 40mA/cm$^2$. However, such cells had low voltages (0.6 volt) as well as low energy densities (0.2whr/in$^3$), whereby the long term storage and use advantages of solid state cells could not be fully exploited. Because of chemical incompatibility, high energy density materials, such as lithium, could not be used with highly conductive electrolyte materials such as the above mentioned rubidium silver iodide. Thus, it became necessary to sacrifice some of the discharge capability in order to extend the life and voltage of solid state cells (to about 5-12 whr/in$^3$ and 2 volts). Alkali metal salts including alkali metal halides and in particular lithium halides which are compatible with high energy density alkali metal anodes have been used as ionic conductors. However, these salts per se are relatively poor ionic conductors (room temperature ionic conductivity of $10^{-7}$ohm$^{-1}$cm$^{-1}$ or less). The most conductive of the alkali metal salts, lithium iodide (room temperature ionic conductivity of $10^{-7}$ohm$^{-1}$cm$^1$) has been accepted as the most useful of the alkali metal salts in high energy density cells. Nevertheless, the use of lithium iodide electrolytes precluded high rate discharge and such cells have a useful discharge capability in the microampere range.

In the U.S. Pat. No. 3,713,897, assigned to the same assignee as the present invention, the ionic conductivity (and rate capability) of lithium iodide was shown as being enhanced by several orders of magnitude (to a room temperature conductivity of $1\times10^{-5}$ohm$^{-1}$cm$^{-1}$). The ionic conductivity was enhanced by mixing aluminum oxide, (whether with or without lithium hydroxide) with the lithium iodide in the formation of a solid electrolyte.

In the U.S. Pat. No. 4,007,122, the conductivity of lithium halides and in particular lithium iodide with aluminum oxide is shown to be increased by the addition of minor amounts of water. However, the inclusion of even minor amounts of water in a solid state cell having a lithium electrode may be detrimental to long term use of such cell since lithium is highly reactive with water. It is therefore an object of the present invention to provide a water free electrolyte additive for use in high energy density solid state cells which provides enhanced ionic conductivity over that of the previously known high energy density electrolytes.

It is a further object to provide a method for the preparation of such electrolyte additive.

It is a still further object to provide such electrolyte additive whereby such electrolyte additive is fully compatible with high energy density materials, will not affect previously attained voltages and which will not degrade over extended periods of time.

These and other objectives will be more evident from the following discussion.

The present invention involves treatment of aluminum oxide (previously used as a conductivity enhancer (U.S. Pat. No. 3,715,897)) with an organo-metallic compound wherein the metal therein is a polar covalently bonded alkali metal. The treatment forms what will be designated M$_x$$^{\delta+}$-Al$_2$O$_3$ with M being selected from Li, Na, K, Rb, and Cs, and with x being less than 1. The "$\delta+$" indicates the number of introduction of the alkali metal into the Al$_2$O$_3$, and not its actual configuration therein. The so treated aluminum oxide is thereafter added to an alkali metal salt to form a solid electrolyte. The alkali metal of the organo-metallic compound is preferably the same as the metal of the alkali metal salt used as the base of the electrolyte. Thus, for example, a lithium organo-metallic compound is used to treat the aluminum oxide when the alkali metal salt of the electrolyte is a lithium salt such as lithium iodide.

Treatment of Al$_2$O$_3$ with molten alkali metal such as lithium, depending upon temperature conditions, will either result in no reaction at all or the formation of lithium aluminates (LiO-Al$_2$O$_3$, or LiAl$_2$O$_4$) which is ineffective in providing enhanced conductivity.

Treatment of Al$_2$O$_3$ with an alkali metal salt or even organic alkali metal salts, is likewise ineffective in providing enhanced ionic conductivity therein.

It is therefore an important criterion of the present invention that the aluminum oxide be treated with a polar covalently bonded alkali metal. Because of this criterion, organo-metallic (according to the strict definition of having direct carbon-metal bonding) compounds having alkali metal substituents are used as the treating materials. Since organo-metallic compounds, having alkali metal substituents, are generally reactive, it is preferred that the compound not contain other substituents which would react directly with alkali metal. Thus, halogens such as chlorine, oxygen and hydroxyl substituents, which when reacted with alkali metals would form alkali metal halide salts, oxides, and hydroxides respectively should be avoided as substitutents. Because of reduced internal reactivity, low viscosity, and general availability, the lower order alkanes (straight chain and alicyclic) having from one to eight carbons (alicyclic from 3-8 carbons) as well as simple aryl groups such as phenyl and methylated phenyl are the most preferred organic substrates for the alkali metal. The organometallic compounds may also be substituted at more than one position by the alkali metal.

Treatment of the aluminum oxide includes the steps of activating the aluminum oxide (alternatively, prior manufactured activated aluminum oxide may be used initially), and intimately, contacting the aluminum oxide with an alkali metal organo-metallic compound for a short period of time sufficient to "alkaliate" the aluminum oxide. Thus, for example, aluminum oxide may be properly treated by simply dipping it into pure n-butyl lithium for about a minute. The time for such treatment is of course dependent upon the degree of contact between the aluminum oxide and the treating organo-metallic material. Thus, finely powdered aluminum oxide will be properly treated at a faster rate than gelled aluminum oxide. Generally, an exothermic reaction is observed during the treating and the end of any heat rise is indicative of a completed treatment. The alkali metal organo-metallic compound need not be pure or undiluted but may, in fact, be diluted to substantially less than one molar. Accordingly, treating time is increased. In fact, the alkali metal organo-metallic compound may even be in powdered solid form where applicable but effective treatment of $Al_2O_3$ therewith requires an even greater length of time. After effective contacting of $Al_2O_3$ with the organo-metallic material the residual organic materials are substantially removed from the treated aluminum oxide. Since the organo-metallic treating materials generally lose the metal to the aluminum oxide the organic substrates tend to link up at the metal sites. The linked up organic substrates are then removed from the aluminum oxide. As an example, treatment of $Al_2O_3$ with n-butyl lithium results in the formation of octane which is removed from the $Al_2O_3$. Removal is desirable since organic compounds are generally insulative and increased conductivity is the objective of the present invention.

Non-polar solvents should be used when diluting the alkali metal organo-metallic compound. Examples of such non-polar solvents include hexane, benzene, ethers, and the like. The solvents should not, however, contain elements reactive with the alkali metal substituents.

In order to form solid electrolytes thereafter, the treated aluminum oxide and an anhydrous alkali metal salt are powdered, blended, heated in vacuum, cooled to ambient temperature, and pulverized. The resultant mixture is made into the electrolyte for a solid state cell in the manner described in U.S. Pat. No. 3,713,897 which disclosure is herein incorporated by reference.

The gelled form of $Al_2O_3$ is preferred over the powder form only because of the more controlled reaction between the gelled form and the treating alkali metal organo-metallic compound.

When used in solid state cells, the treated aluminum oxide is stable under conditions of long term storage. The treatment does not detrimentally affect the voltage or other characteristics of a finished solid state cell when compared to cells having an electrolyte containing untreated aluminum oxide. Except for the marked increase in ionic conductivity and greater discharge capability, cells made with or without treated aluminum oxide are substantially identical.

The following examples are set forth to more specifically illustrate both the treatment of aluminum oxide for use in solid state cells having a lithium anode and a lithium iodide based electrolyte and the improved characteristics of cells including such pretreated aluminum oxide without concomitant drawbacks or instability or voltage fluctuation. It is understood, however, that such examples are for illustrative purposes only and specific enumeration of detail is not considered as a limitation thereof. Except where indicated, all parts are parts by weight.

EXAMPLE 1

Aluminum oxide, $Al_2O_3$ (Alcoa H51) is dried at about 600° C. for two days. Upon cooling to ambient temperature the dried aluminum oxide is added to a hexane solution of 2.5 M n-$C_4H_9Li$ (1 ml n-$C_4H_9Li$ solution per 1 gm aluminum oxide) for about 15 minutes. The aluminum oxide is thereafter removed from the solution and evacuated for about 15 minutes.

Anhydrous lithium iodide and the above treated aluminum oxide are thereafter mixed together in powder form in an equimolar ratio. The mixture is well blended and heated in a vacuum to 500° C. for about 2 hours. After the mixture is cooled to ambient temperature, the mixture is pulverized.

One gram of the above dried and pulverized lithium iodidealuminum oxide mixture is pressed to a pellet in a 0.6 inch diameter steel die under a pressure of 100,000 psi. Lithium discs with titanium current collectors are pressed on both sides of the pellet under 50,000 psi to form a conductivity cell. The ionic conductivity is measured at room temperature and is found to be about $1 \times 10^{-4} ohm^{-1} cm^{-1}$. The above cell is thereafter stored in a dry box at 27° C. for more than six months. The conductivity after such storage is the same as that of the freshly prepared cell.

EXAMPLE 2

Five conductivity cells are made in accordance with the procedure in Example 1 but with varying mole percentages of treated aluminum oxide to lithium iodide of 20%, 30%, 40%, 55%, and 60%. The measured room temperature conductivities are about $2 \times 10^{-5}$, $4 \times 10^{-5}$, $6.5 \times 10^{-5}$, $10 \times 10^{-5}$, and $8.5 \times 10^{-5} ohm^{-1} cm^{-1}$ respectively.

EXAMPLE 3

Six conductivity cells are made in accordance with the procedure in Example 1 but with varying concentrations of n-butyl lithium in hexane of 2.0, 1.5, 1.0, 0.7, 0.5, and 0.25 M. The measured room temperature conductivities are about $10 \times 10^{-5}$, $10 \times 10^{-5}$, $10 \times 10^{-5}$, $9 \times 10^{-5}$, and $7 \times 10^{-5} ohm^{-1} cm^{-1}$ respectively.

EXAMPLE 4

Two solid state cells are constructed with a lithium anode disc (geometric area 1.48 $cm^2$), a solid cathode having the composition of 40% $PbI_2$, 40% PbS and 20% Pb with the cathode weighing 260 mg (geometric area 1.8 $cm^2$) and identical electrolytes of LiI with aluminum oxide contained therein. However, one cell is made using untreated aluminum oxide and the other cell is made with the treated aluminum oxide of the present invention. The O.C.V of both cells is $1.95 \pm 0.05$ volts.

From the above examples it is clearly evident that the treating of the aluminum oxide results in an increase of ionic conductivity of an order of magnitude. Furthermore, such increased ionic conductivity is stable even over the passage of extended periods of time. Finally, Example 4 in particular indicates that treatment of the aluminum oxide does not affect the O.C.V. of the cells made with such treated $Al_2O_3$ when compared to cells made with untreated $Al_2O_3$.

A preferred mole ratio of aluminum oxide to lithium iodide is in the range of 50–55 m/o.

A preferred concentration of n-butyl lithium for the purposes of treating the aluminum oxide therewith is at least 0.7 molar.

However, these preferred ratios and concentrations are variable with respect to other alkali metal salts relative to the crystal structure of the other alkali metal salt electrolytes, the amount of alkali metal in the alkali metal organo-metallic compound as well as other variables evident to one skilled in the art.

Though lithium is the preferred anode material other high energy density materials include metals above hydrogen in the EMF series such as sodium, potassium, rubidium, cesium, magnesium, calcium, aluminum, and alloys thereof.

The foregoing examples are presented for the purpose of illustrating the invention and its attendant advantages and feasibility of use. It is understood that changes and variations including the amount and types of alkali metals, the structure of the organic substrates for the alkali metals as well as variations in treating concentrations and mole ratios of $Al_2O_3$ to alkali metal salts may be made without departing from the scope of the present invention.

What is claimed is:

1. A method for introducing an alkali metal into aluminum oxide comprising the step of intimately contacting activated aluminum oxide with an alkali metal organo-metallic compound having said alkali metal attached therein by a polar covalent bond, for a period of time sufficient to introduce said alkali metal into said aluminum oxide.

2. The method of claim 1 wherein said alkali metal is lithium.

3. The method of claim 2 wherein said organo-metallic compound has an organic substrate selected from the group consisting of an alkyl group having 1–8 carbon atoms, an alicyclic group having from 3–8 carbon atoms, a phenyl group, and a methylated phenyl group.

4. The method of claim 3 wherein said organo-metallic compound comprises n-butyl lithium and said n-butyl lithium is dissolved in a solvent in a manner sufficient to provide said n-butyl lithium of at least 0.7 molar.

5. Aluminum oxide having an alkali metal therein prepared in accordance with the method of claim 1.

6. A solid electrolyte for use in a solid state electrochemical cell comprising a mixture of the aluminum oxide of claim 5 and an alkali metal salt.

7. The solid electrolyte of claim 6 wherein said alkali metal of both said organo-metallic compound and said alkali metal salt is lithium.

8. The solid electrolyte of claim 7 wherein said alkali metal salt is lithium iodide.

9. A solid state electrochemical cell comprising an anode, a cathode, and the electrolyte of claim 6.

10. The solid state cell of claim 9 wherein said anode is comprised of a metal above hydrogen in the EMF series.

11. The solid state cell of claim 10 wherein said anode is lithium and wherein the alkali metal of both said organo-metallic compound and said alkali metal salt is lithium.

12. The solid state cell of claim 11 wherein said alkali metal salt is lithium iodide.

* * * * *